United States Patent [19]
Kotloff

[11] Patent Number: 6,059,424
[45] Date of Patent: May 9, 2000

[54] FLUORESCENT LIGHTING FIXTURE

[76] Inventor: Ronald F. Kotloff, 4223 N. St. Elias, Mesa, Ariz. 85205

[21] Appl. No.: 09/007,291

[22] Filed: Jan. 14, 1998

Related U.S. Application Data

[63] Continuation-in-part of application No. 08/657,377, Jun. 3, 1996, Pat. No. 5,727,871.

[51] Int. Cl.[7] .............................. F21V 21/02; F21S 3/00
[52] U.S. Cl. ..................... 362/220; 362/221; 362/287; 362/374; 362/427
[58] Field of Search ................................. 362/404, 427, 362/374, 375, 285, 287, 220, 221

[56] References Cited

U.S. PATENT DOCUMENTS

| | | | |
|---|---|---|---|
| 2,615,123 | 10/1952 | Guth | 362/220 |
| 4,564,886 | 1/1986 | Morcheles | 362/287 X |
| 5,081,569 | 1/1992 | Quiogue et al. | 362/375 X |
| 5,289,358 | 2/1994 | Halemeier | 362/287 X |
| 5,564,815 | 10/1996 | Littman et al. | 362/287 X |

*Primary Examiner*—Laura K. Tso
*Attorney, Agent, or Firm*—Gregory J. Nelson

[57] ABSTRACT

A fluorescent light fixture or luminaire having a housing which has hinge assemblies which pivotally support a mounting plate. The hinge assembly allows the mounting plate on which the lamps and ballasts are mounted to be pivoted to a generally vertical service position or latched by detents in a horizontal use position within the housing. The lens frame is also latched by detents and is pivotal to a vertical position for access to the housing interior. A selected number of lamp sockets can be selectively secured to the plate to receive the lamps. Reflectors and lamp stand-offs may be secured to the mounting plate at bendable tabs formed in the mounting plate. The light fixture is adapted for use with standard or high efficiency compact lamps.

10 Claims, 7 Drawing Sheets

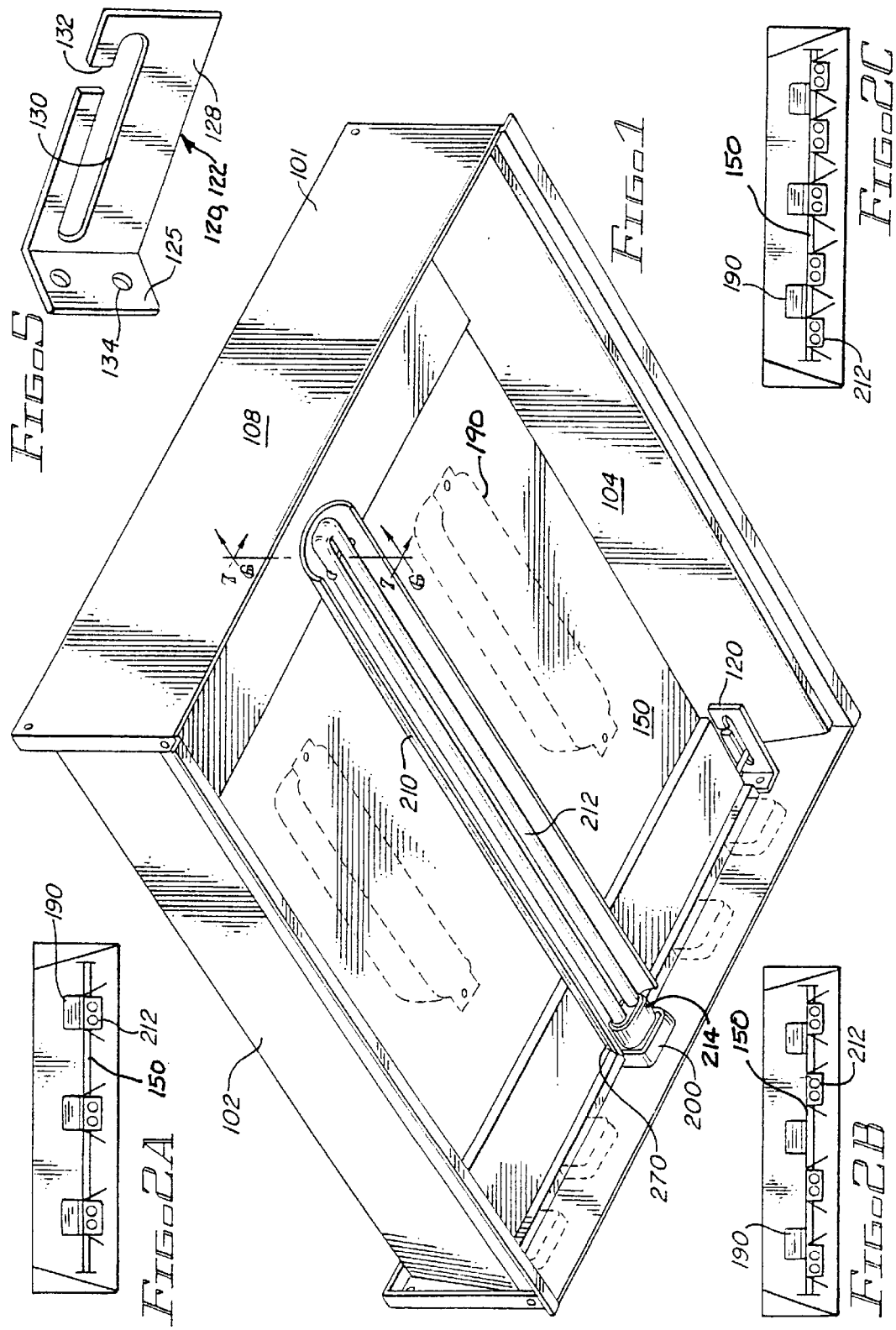

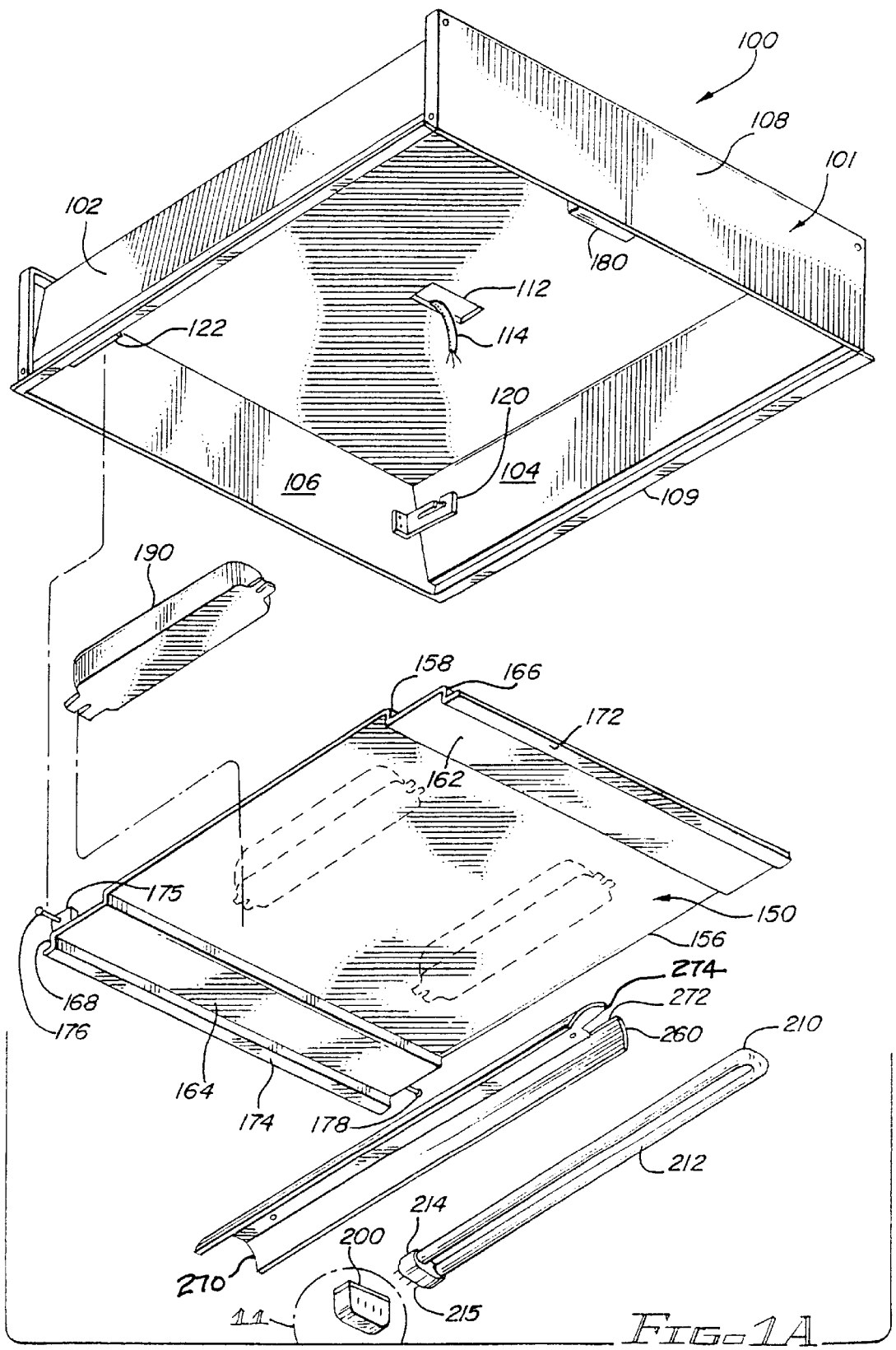

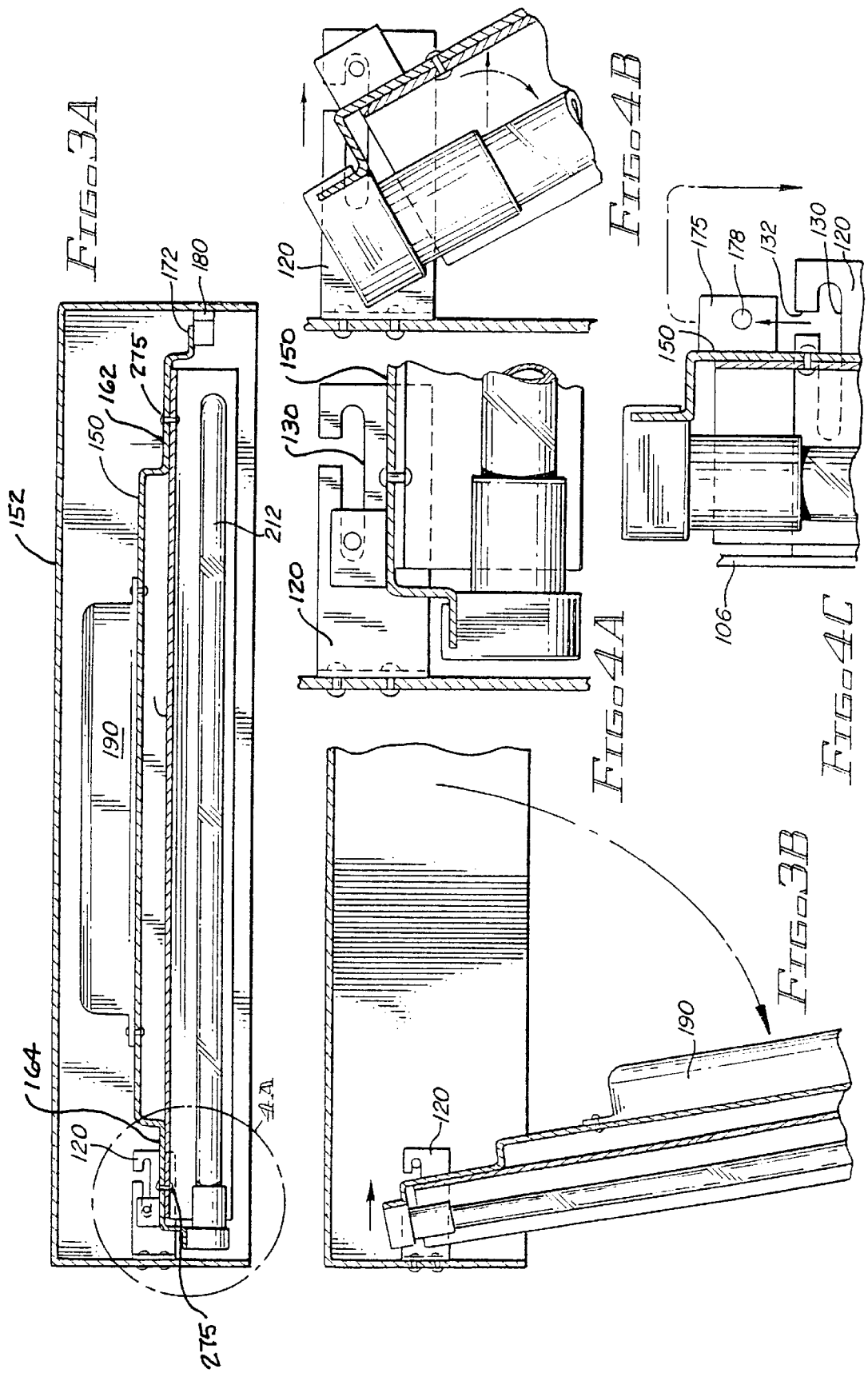

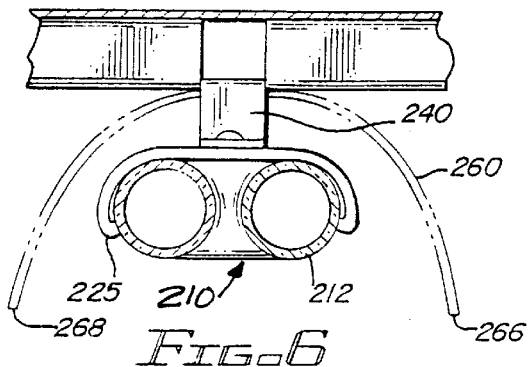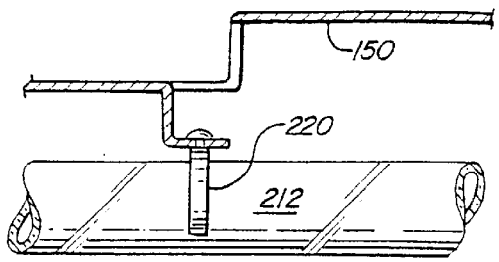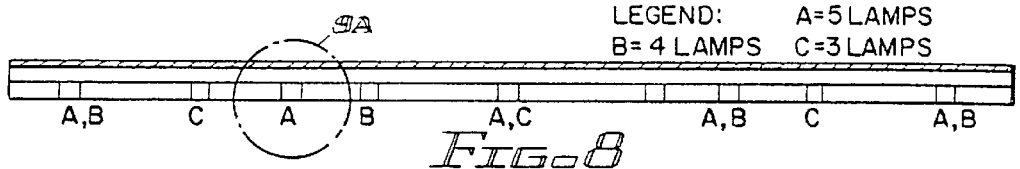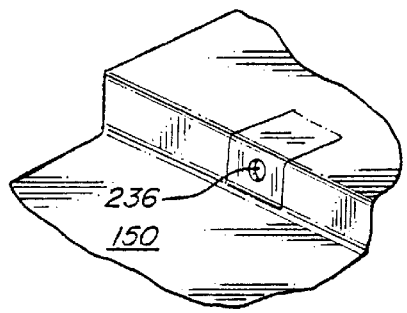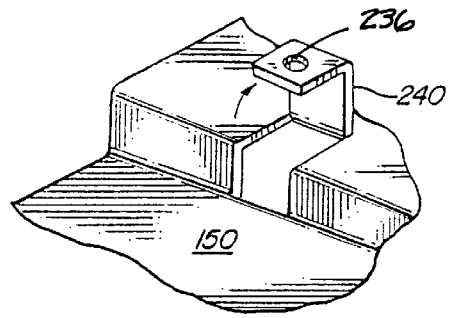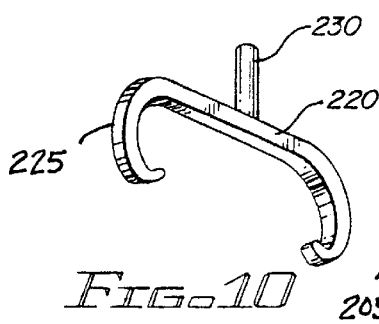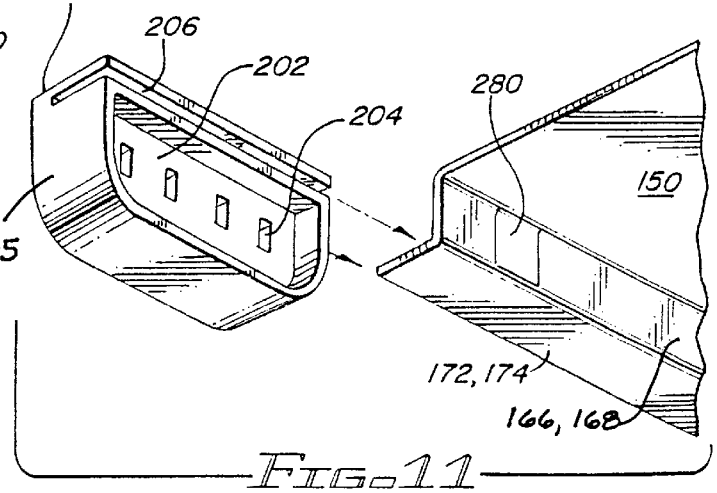

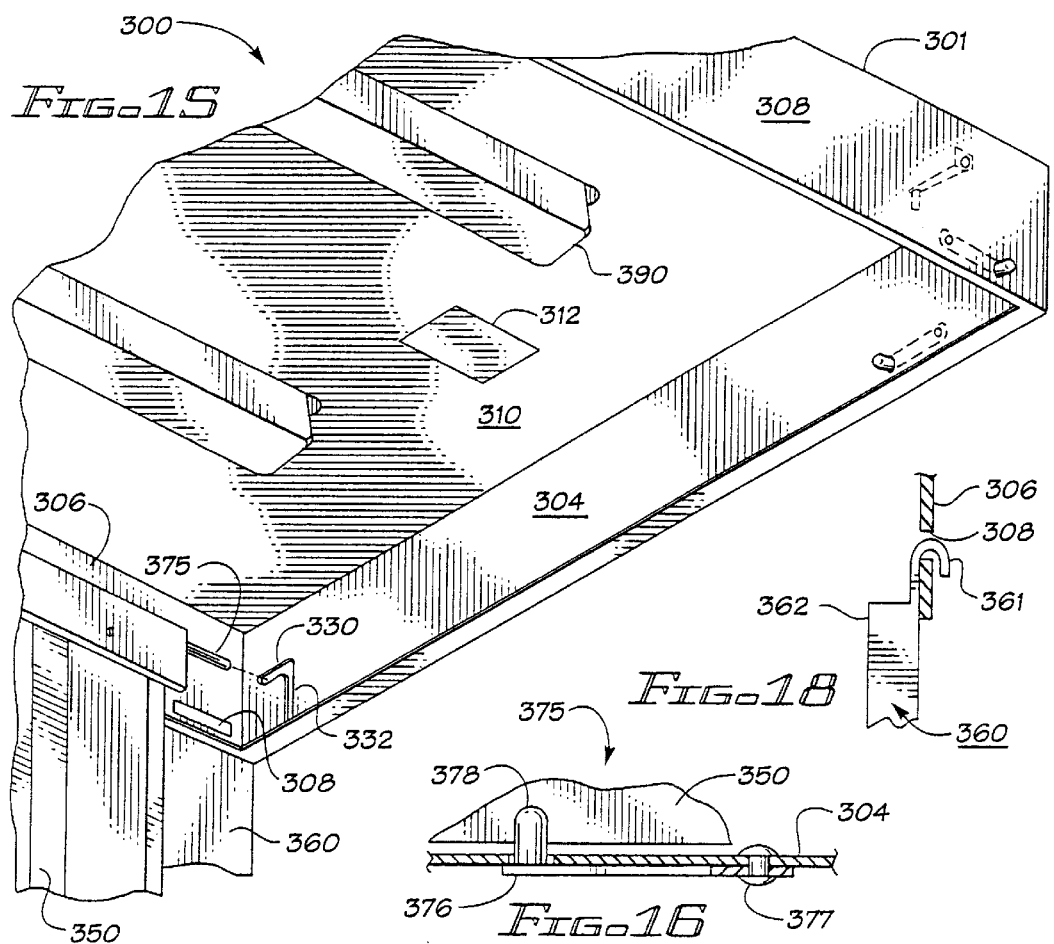
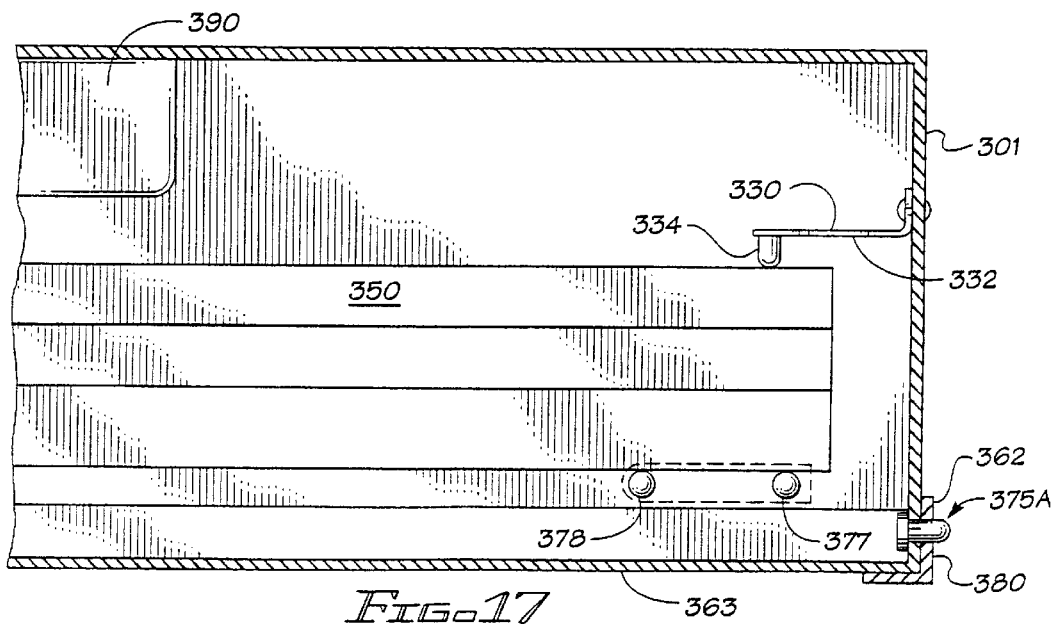

FLUORESCENT LIGHTING FIXTURE

The present application is a continuation-in-part of U.S. patent application Ser. No. 08/657,377, filed Jun. 3, 1996, entitled "Fluorescent Lighting Fixture" now U.S. Pat. No. 5,727,871, issued Mar. 17, 1998.

The present invention relates to indoor and outdoor lighting fixtures and more particularly relates to the construction of fluorescent lighting fixtures of the type which are modular and which fixtures facilitates convenient, installation, maintenance and repair.

BACKGROUND OF THE INVENTION

Fluorescent lighting fixtures, sometimes termed "luminaires", are widely used in business, factory and residential lighting applications. Presently, the most common type of fixture is the modular 2' by 4' fixture recessed as part of a suspension system or surface mounted on a ceiling. Fixtures of this type have two to four lamps with four lamps being most common. In accordance with conventional construction, two pairs of fluorescent lamps are each connected in series and each activated by a common ballast. Generally one ballast controls the two outer lamps and another ballast controls the inner two lamps. The lamps are disposed in parallel arrangement within a metal housing or frame sometimes termed a "troffer". A diffuser or lens of translucent or transparent material extends across the opening of the fixture below the fluorescent lamp tubes.

The Energy Policy Act of 1992 is a comprehensive bill having lighting energy efficiency provisions which prohibits production of certain lamps. As a result of the requirements of building owners and facility managers for high performance lighting and further due to the impact of EPAC, many users are turning to "high efficiency compact fluorescent lighting systems." These systems utilize shorter two foot U-shaped fluorescent lamps. These lamps, as the more conventional older systems, are often mounted in an enclosure and are connected to a ballast very similar to the construction of the older systems. The newer luminaires are often smaller, often being only 2'×2' as compared to the longer 4' older fixtures.

A significant problem common to both the older fluorescent systems and the newer compact systems is convenience of installation and accessibility for maintenance when it becomes necessary to replace a burned out or non-functioning ballast or lamp. Generally replacement of a ballast requires that the maintenance person first remove the lamps and then remove a panel which is held in place by tabs or mechanical fasteners to gain access to the ballast. This procedure is time consuming. Similarly, initial installation often requires several separate installation tasks which have to be coordinated between several trades including an installer and an electrician.

There are various fixtures in the prior art which are designed to provide improved access to the fixture are designed to facilitate more efficient installation and maintenance.

For example, U.S. Pat. No. 3,240,928 relates to a lighting fixture which enables detachment of a lamp reflector housing from a separate ballast chamber and which does not require removal of the ballast chamber from the support structure. The lamp and ballast chambers are separate and each have removable or hinged lids for ease of servicing.

U.S. Pat. No. 4,342,072 shows a lighting fixture with a housing having a pair of supporting members disposed longitudinally along the inner portion of the wall to slidingly engage the circuitry and a light carrying tray. According to the patentee, routine maintenance such as changing a light or ballast transformer does not involve any substantial disassembly.

U.S. Pat. No. 4,870,549 shows a ceiling light which has a projection in the form of a lid pivotally mounted to the housing base into which the electrical components are attached. During the insertion of the light housing, the lid together with the electrical components can be pivoted through a rectangular opening in a side wall of the housing.

U.S. Pat. No. 5,274,533 discloses a reflector assembly in which access to the ballast of the luminaire is improved by providing a removable section of the reflector assembly located over the ballast.

Despite attempts made in the prior art to provide an improved and more installation and maintenance friendly light fixture designs, there nevertheless remains a need for an improved light fixture of this type.

BRIEF SUMMARY OF THE INVENTION

Accordingly, it is a primary object of the present invention is to provide an improved light fixture for use with either conventional or high efficiency compact lamps which fixture provides easy and convenient installation and maintenance.

Briefly, the present invention relates to a lighting fixture sometimes termed a "luminaire" which may be installed as either an indoor or outdoor unit and which may be incorporated as part of various types of fixtures such as aisle lighters, canopies and troffer units. Accordingly, the present invention is generally applicable to lighting units of various types and sizes.

The lighting fixture of the present invention has a housing which is generally rectangular or square having side walls and a top wall. The housing is generally constructed of sheet metal and suitably coated or painted with a light-colored light reflecting coating. A knock-out is provided in the top wall through which electrical conduit can be extended to make connections with the ballast and lamps. The housing carries a pair of opposed hinge brackets secured to the interior walls of the housing which hinge brackets each define elongated slots. The hinge brackets may also be formed, as by stamping, as an integral part of the housing.

A mounting panel, which generally conforms to the size and shape of the interior of the housing being somewhat smaller in size, is provided with hinge pins which are engageable in the elongated slots in the hinge brackets. A latch has interacting components on the panel and on the interior of the housing, preferably in the form of detents. Thus, the mounting panel may be latched in a normal operating position generally horizontally disposed with respect to the top wall of the housing or the latch may be released so that the panel pivots downwardly to a position in which it is suspended or hangs in a general vertical position. In the unlatched vertical position, easy access is provided to both sides of the panel and to the interior of the housing for maintenance. The panel may also be removed from the housing by disengaging the hinge pins from the brackets. A lens frame is also pivotally mounted to the housing and is releasably held in a horizontal position by detents.

The panel carries lamps on the lower panel surface and ballasts are mounted on the upper, opposite surface of the panel. A selected number of lamps, generally from one to six may be installed as required by the user. Installation of lamps is easily facilitated as lamp sockets are detachably secured at edges of the interior mounting panel. Similarly, a reflector is secured to the panel above each lamp. Preferably, the reflector may be secured by a mechanical fastener or by bendable tabs stamped or formed in the panel. Support for the lamps is provided by standoffs which are secured to the panel by tabs stamped into the panel. The design allows the user to select the desired number and the location of lamps and to easily assemble the desired lighting configuration by appropriately positioning sockets and bending selected mounting tabs into position as required.

At the time of installation, conduit is pulled through the knockout opening in the upper wall of the housing so electrical connection can be easily wired to the ballast by a use of a conventional wire nuts. Maintenance is convenient as the mounting panel can be released from its normal horizontal operating position to allow the panel to pivot downwardly which provides the maintenance worker access to both the ballast and lamp side of the mounting panel. The construction described above also allows convenient retrofitting of conventional systems to the newer, more efficient fixture arrangement described above.

BRIEF DESCRIPTION OF THE DRAWINGS

The above and other objects that advantages the present invention will be more fully understood and appreciated from the following description, claims and drawings in which:

FIG. 1 is a perspective view showing the fixture of the present invention with one lamp installed therein;

FIG. 1A is an exploded perspective view of the fixture showing the various components thereof;

FIGS. 2A, 2B and 2C are representative cross sectional views of the mounting panel showing various lamp configurations that may be selected by the user or installer;

FIG. 3A is cross sectional view of the lighting fixture of the present invention;

FIG. 3B is an enlarged view of the left end of the figure shown in 3A with the panel shown in the unlatched, generally vertical position;

FIG. 4A is a detail view of the hinge mechanism as indicated by the circular area in FIG. 3A with the panel shown in the normal horizontal operating position;

FIG. 4B is similar to 4A in which the panel has been released and is shown approaching a hanging or vertical position;

FIG. 4C illustrates the hinge arrangement shown in 4A showing the manner in which the panel can be removed from the housing;

FIG. 5 is a perspective view of the hinge bracket;

FIG. 6 is a sectional view taken along line 6—6 of FIG. 1,

FIG. 7 is a sectional view taken along line 7—7 of FIG. 1;

FIG. 8 is a sectional view of the mounting panel;

FIG. 9A is the enlarged detail view of a portion of the mounting panel showing a mounting tab formed as part of the stamping operation during fabrication of the panel;

FIG. 9B is a view similar to FIG. 9A in which the mounting tab has been extended to a mounting position;

FIG. 10 is a perspective view of a lamp standoff;

FIG. 11 is a detail perspective view showing the mounting of a lamp socket to the peripheral edge or lip of the mounting plate;

FIG. 15 is a partial perspective view of an alternative embodiment of the present invention;

FIG. 16 is a sectional view taken along line 16—16 of FIG. 15 showing a detent;

FIG. 17 is a partial side view of the assembly of the present invention with the reflector panel and lens panel in a closed position each secured by a detent; and FIG. 18 is a detail view showing the lens panel hinge.

DETAILED DESCRIPTION OF THE DRAWINGS

Figure 12:
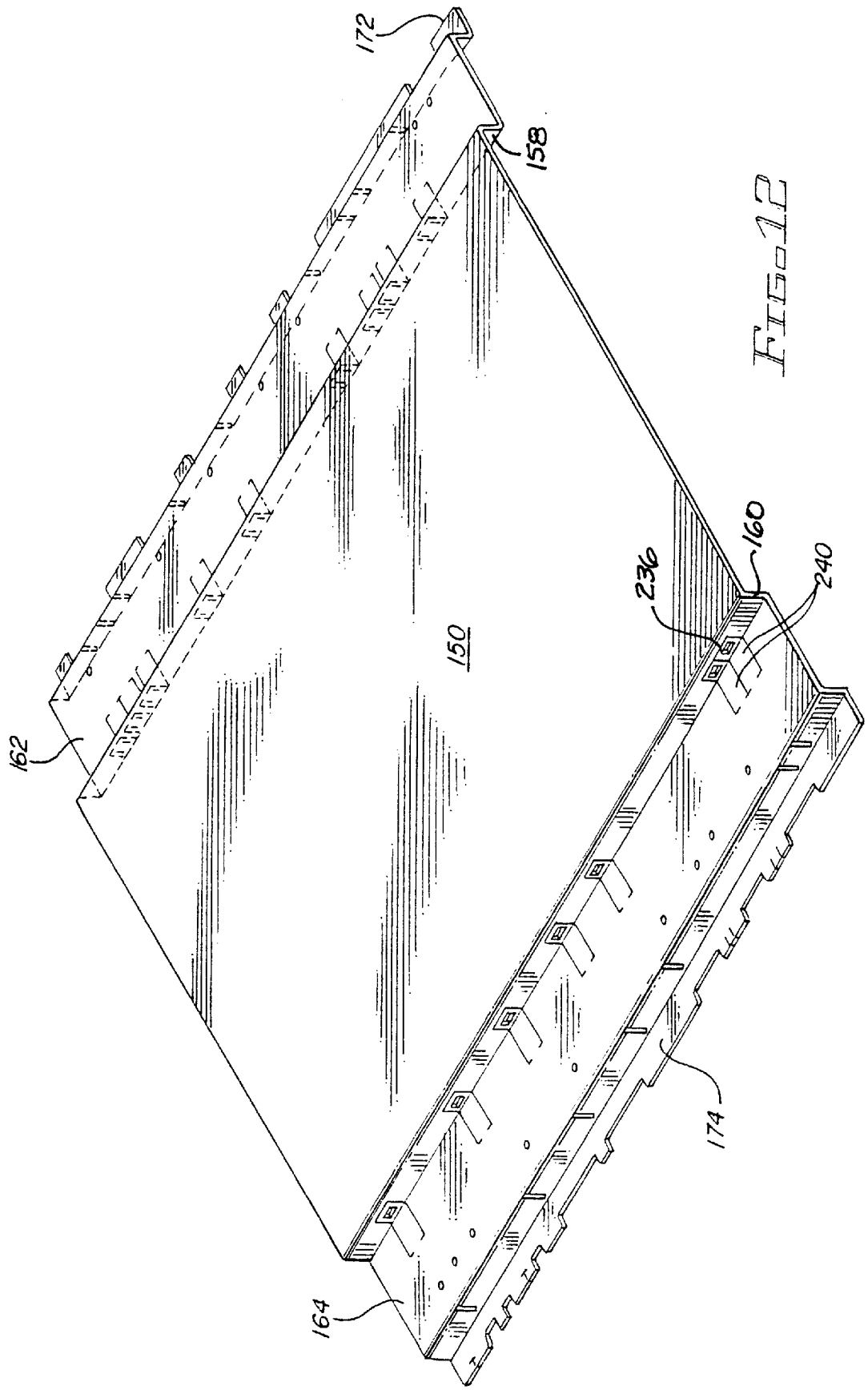
FIG. 12 is a perspective view of the mounting panel showing the location of the bendable mounting tabs.

Turning now to the drawings, the light fixture of the present invention is generally designated by the numeral 100 as best seen in FIGS. 1 and 1A includes a housing or enclosure 101 which is shown as square but may be any convenient configuration such as rectangular. The housing includes opposite side walls 102 and 104, 106 and 108. The side walls may be formed from any suitable material such as sheet metal and joined by conventional means, such as by welding, or use of rivets or sheet metal screws. The housing or enclosure is completed by a top wall 110 which is generally planar extending between the upper edges of the side walls. The top and opposite side walls such as side walls 106 and 108 may be integrally formed from a section of sheet metal and suitably formed on a brake or similar device as is well known. The housing 101 shown in FIGS. 1 and 1A is for a troffer type of fixture which is recessed within the ceiling such as a drop ceiling and has peripheral flanges 109 which overlap the ceiling material when installed.

The housing 101 may be also configured as a canopy-light or an aisle lighter type of fixture as the present invention lends itself to use with various types of conventional lighting fixtures presently in use. As indicated above, the housing shown is square and typically would be approximately 2'×2' in length and width so as to accommodate standard, high efficiency, compact lamps.

The top wall 110 is provided with one or more knockouts 112 to accommodate insertion of electrical conduit 114 extending to the fixture from the electrical box or power source. The interior of one of the housing sidewalls such as sidewall 106 supports a pair of spaced-apart inwardly extending hinge brackets 120 and 122. The brackets which are shown in detail in FIG. 5 are generally L-shaped having a having base portion 125 and an arm 128 which extends generally at right angles with respect to the base 125. The arms 128 of each of the brackets 120, 122 define a generally horizontally extending elongate slot 130. The bracket also defines an access opening 132 extending from the upper surface of the bracket arm to the elongate slot 130. The brackets may be separately fabricated and secured to the interior of the side wall of the housing by conventional fasteners such as sheet metal screws extending through bores 134 in the base of the bracket. Alternatively, the brackets may be formed as an integral part of the side wall by stamping the configuration of the bracket from the material of the side wall. For example, the upper, lower and outer edge of the arm 128 and the configuration of the elongate slot 130 and opening 132 can be stamped from the material of wall 106. When the housing is assembled, the arms 128 would be bend inwardly to form a right angle with the side wall of the housing.

A principle advantage of the present invention is that the fixture provides convenience of installation and easy access for maintenance. To accommodate maintenance and installation, a mounting panel 150 is secured within the housing pivotally suspended between the brackets 120 and 122. The panel is best seen in FIGS. 1A and 3A and is shown having a generally planar intermediate or central section 152. The panel 150 has generally parallel opposing sides 154 and 156. The panel 150 can be formed by conventional metal bending or forming operations and formed from aluminum or galvanized sheet metal or similar material.

A short vertical wall or lip 158 and 160 are formed respectively at opposite edges of section 152. Flanges 162, 164 are formed respectively extending from the upper edges of opposite walls 158 and 160. Short vertical wall sections 166 and 168 are formed at the outer edges of flanges 162 and 164 respectively. A lip is provided at the outer extremities of the panel which extends horizontally at 172 and 174 respectively. The panel is provided with a pair of tabs 175 which extend from the upper surface of the panel at the opposite edges of flange section 164. The tabs 175 each mountingly support a pair of pivot pins 176 and 178 which project outwardly and which are axially aligned. It will be noted that the dimensions of the panel 150 are selected so that it may be positioned within the interior of the housing. The panel is pivotally supported by the pins 176 and 178 which are engageable in the elongate slots 130 in the brackets 120 and 122. Access openings 132 in the brackets facilitate insertion of the pivot pins into the elongate slots. Reference is made to FIG. 4C in which the panel 150 is shown in a generally vertical position with the pivot pins 176, 178 aligned with the access opening 132 to facilitate insertion and removal of the panel from the brackets 120 and 122. FIG. 4A illustrates the normal use position of the panel within the housing. In this position, the panel is held in a general horizontal position by latch 180 which, when closed, engages the edge of lip 172 as seen in FIG. 3A. In FIG. 4B, the panel is shown in an intermediate position. The slots 130 allow the panel and its attached components to slide forwardly to provide clearance as the panel pivots downwardly.

The mechanical/electrical components are mounted on panel 150 so that they may be easily accessed for installation and maintenance. The ballasts 190 are mounted on the upper surface of the central section 152 of the panel. Since the fixture of the present invention can accommodate a selected number of lamps, from one to six, the number of ballasts 190 will depend on the number of lamps incorporated in the fixture. Normally, a ballast will service two lamps so that from one the three ballasts 190 will be mounted by suitable screws or fasteners to the upper surface of the panel. A typical mounting position for the ballasts is shown in dotted lines in FIG. 1.

Figure 13:
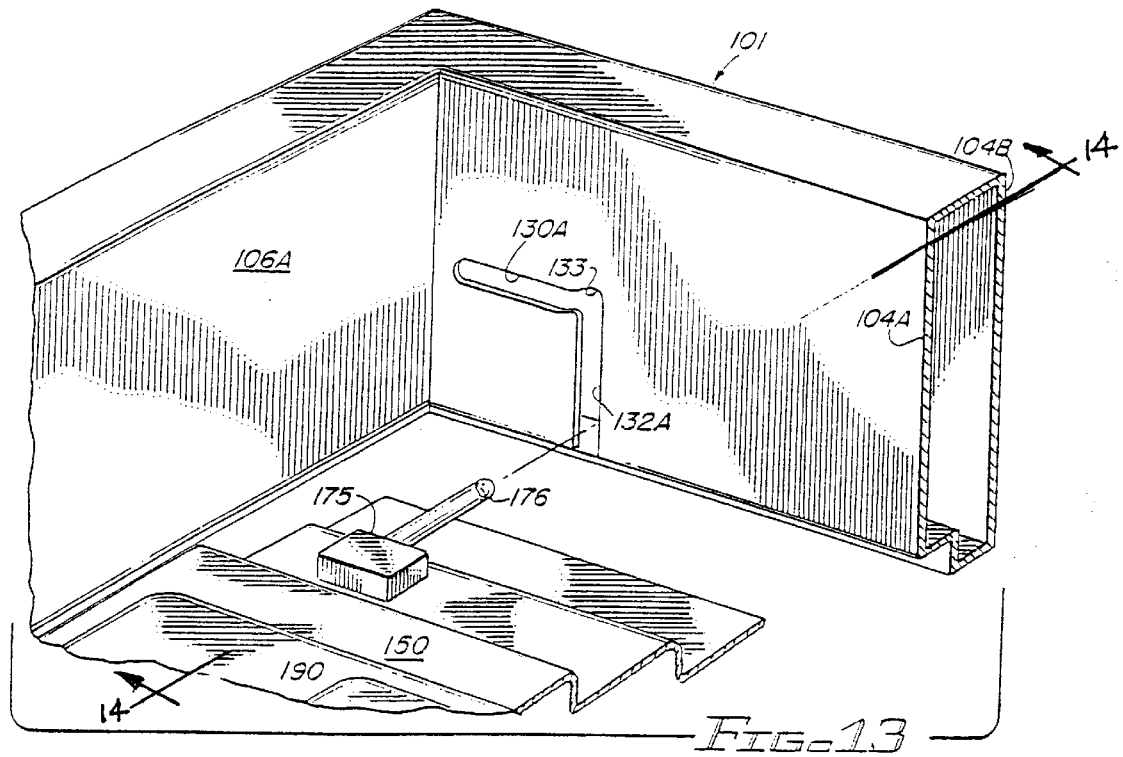
FIG. 13 is a detail view of an interior corner of the fixture housing and a portion of the mounting panel illustrating an alternate hinge construction.
Figure 14:
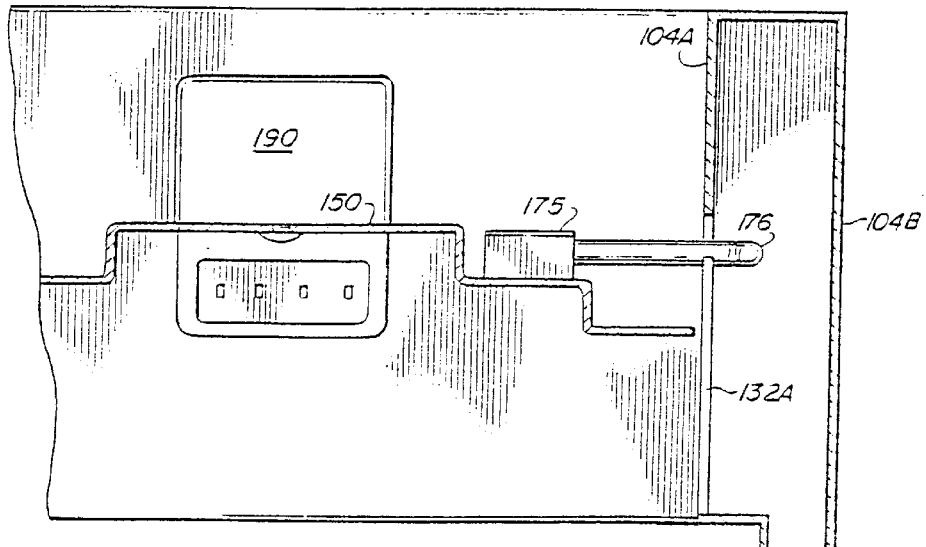
FIG. 14 is a cross-sectional view taken along line 14—14 of FIG. 13 with the panel shown engaged in the hinge slot.

In FIGS. 13 and 14, the housing 101 is formed having inner and outer walls 104A and 104B. Vertical slots 132A and intersecting horizontal slot 130A are provided in wall 104A. A detent area 133 is provided at the intersection of the slots. A similar slot, not shown, would be similarly located in the interior wall opposite wall 104A. Panel 150 is pivotally supported on pins 176 and oppositely positioned pin not shown. The panel 101 is pivotally engaged in the housing by placing the pin 176, and the opposite pin, in their respective vertical slots 132A and manually elevating the hinge pins over detent area 133 and then sliding the pin horizontally, rearwardly in slots 130A. The panel is pivotally mounted for convenience of installation and may easily be removed. The advantage of this construction is that the hinge bracket component can be fabricated as a slot integrally formed in the housing wall.

A selected number of lamp sockets 200 as seen in FIG. 11 may be selectively attached to lip portions 172 and 174 of panel 150. The lamp sockets 200 each define a plug section 202 which has apertures 204 for receiving the pins on the end of a lamp. The lamp sockets have a body 205 which defines a transverse slot 206 near the upper edge which slot is engageable with the flange, 172, 174 as seen in FIG. 11. Thus the lamp sockets 200 can be easily positioned at desired locations at opposite sides of the panel 150 at flange portions 174 and 172. In a normal configuration in which the housing contains five lamps, it would be conventional to position three lamp sockets at one edge of the panel as for example flange 174 and two lamp sockets at the opposite edge of the panel at flange 172 so the lamps are alternately and oppositely configured. The desired location sockets and a number of sockets can easily be selected by the manufacturer or by the installer at the time of installation by selectively engaging and positioning sockets 200 along the respective flanges 172 and 174.

Various lamp configurations are shown in FIGS. 2A, 2B and 2C. The individual sockets are electrically connected to the associated ballast 190 by conductors, not shown, extending from the sockets to the ballast located on the upper surface of the panel 150. The lamps 210 may be any type but are shown as high efficiency, compact fluorescent units having a general U-shaped elongate tube 212 with a base 214. The base of each lamp has a plurality of pins 215 which establish the electrical connection with the associated socket 200 are engageable in the plug portion 202 of the socket.

The individual lamps 210 are further secured in position by standoffs 220 as seen in FIGS. 6, 7, and 10. Preferably when in position the lamps tilt downwardly from the base end approximately 2" to 3". The standoffs each consist of a C-shaped clip portion 225 which are detachably engageable about the lamp tubes 212 as best seen in FIG. 6. The material of the standoff may be of a suitable resilient, non-conductive material such as a plastic. The standoff is shown as having a pin-like projection 230 extending from the body of the stand-off. The pin 230 is received within an aperture 236 in tabs 240 as illustrated in FIGS. 9A, 9B, FIG. 12. The tabs 240 are preferably integrally formed as a portion of the panel 150 in the metal-forming fabrication of the panel. The tabs 240 are formed at selected locations in the opposite flanges 162 and 164 and their associated adjacent vertical walls 158 and 160. The tabs are formed by severing the flanges and the adjacent walls of the panel to form one shape of the tabs. A hole 236 may also be punched in the portion of the tab. Once the desired number of lamps have been selected, selected tabs 240 can then be bent to a vertical position as shown in FIG. 9B. The standoff 220 can then be inserted into the aperture 236 in the now-depending tab. Alternately, the C-shaped portion of the stand-off may be fabricated without the projecting pin 230 and the standoff connected to the tab by a conventional fastener such as a sheet metal screw.

A reflector 260 may be associated with each of the lamps as is conventional to enhance the lighting effect. Each reflector 260 is formed of a suitable material such as a polished aluminum having the desired reflective characteristics. Each reflector is elongate having its length approximately corresponding to the length of the individual lamps and each reflector has a generally parabolic cross-section extending below the level of the lamps as best seen in FIG. 6. The reflector has opposite, generally parallel edge 266 and 268 and opposite ends 270 and 272. The reflector can be formed by shaping it onto a mandril or similar tooling. End 272 of the reflector is provided with a recess 274 to accommodate a tab 240 for the standoff so that the reflector will fit around the tab. The reflector can be secured in place by suitable fasteners such as sheet metal screws 275 extending through the surface of the reflector into flanges 162 and 164 of the panel 150. This is best seen in FIG. 3A.

An alternate means of mounting the reflector 260 is by severing sections 166 and 168 of panel 150 at a plurality of spaced-apart locations to form a plurality of tabs 280 as seen in FIG. 11. The tabs extend from the lower edge of the walls 166, 168 to approximately the bend line at the upper end of the wall. The tabs are provided at locations which would align with locations of reflectors 250. The reflector can be held in place by bending the appropriate tab about the ends 270, 272 of the reflector to secure the reflector in place on the panel.

The fixture of the present invention facilitates both installation and ease of maintenance. To install the fixture, be it an aisle light, canopy light or troffer, the housing 101, is secured in position by a conventional means such as by use of fasteners or suspension members. With the housing 101 in place, the knock-out 112 in the top wall 110 of the fixture can be removed and the electrical conduit 114 extended through the knock-out. Panel 150 which when disassembled is separate from the housing, can be completed by attaching the components such as the ballast and selected number of lamps. The lamps typically will number from 1 to 6, depending upon the installation requirements. FIGS. 2A through 2C show various lamp configurations. If, for example, four lamps are selected, typically two ballasts 190 would be secured to the upper surface of the panel 150 by fasteners. The next step in the assembly of the modular system would be to attach two sockets 200 at each end of the panel by sliding the two sockets onto flange 174 and sliding the two sockets in opposed relationship along flange 172.

Two standoffs to support two lamps are erected by selecting tabs 240 located along flange 162 and two standoffs will be erected by manually bending the tabs from positions along the flange 174, as seen in FIG. 12. Clips, such as clip 230, are then inserted into the bores in the standoffs. The lamps may be then positioned by inserting the pins in the base of the lamp into the respective sockets so that the panel is now provided with four lamps, two extending from sockets along edge 174 and two extending from sockets along edge 172 in alternating relationship.

The panel can now be inserted into the hinge brackets by grasping the panel and elevating it so that the pivot pins 176 and 178 are aligned with the opening 130 in the upper surface of the brackets. The opening 130 allows the pivot pins to drop into elongate slot 130 generally as shown in FIG. 3B. In this position, electrically connecting the ballasts to the conduit 114 is a simple matter as the wires are all readily accessible. The conduit can be wired to the ballasts simply by using conventional wire nuts. A similar procedure is followed with respect to the embodiment shown in FIGS. 13 and 14.

The assembly is completed by pivoting the panel 150 upwardly until the panel is in the position shown in FIG. 3A and locked in place by means of latch 180 which engages the edge 172 of the panel. A suitable diffuser or lens may be positioned across the opening at the bottom of the housing beneath the lamps.

In the event servicing is necessary, the diffuser is first removed and the latch 180 operated to release the panel so that it may be pivoted downwardly as shown in FIG. 3B to provide easy access to both the lamp side and the ballast side of the mounting panel.

FIGS. 15 to 18 show an alternate embodiment of the present invention generally designated by the numeral 300. In the embodiment shown in these figures, lighting housing 301 is fabricated from a suitable material such as sheet metal. The enclosure is completed by side walls and walls 304, 306 and 308 are shown. A flat or planar top 310 extends between the upper edges of the side walls and supports electrical equipment such as ballasts 390. A knock-out 312 may be provided in the top wall for convenience in connecting to external electrical connections.

A mounting panel 350 is shown as a drop panel which has a lower reflective surface which supports the required number of lamps. The panel 350 has a pair of oppositely extending pivot arms 375, one of which is shown in FIG. 15. The pivot arms engage appropriate slots 330 in the opposite side walls, such as side wall 304. The slots 330 preferably are configured having a vertical section 332 so that the pivot rod may be engaged or disengaged from the slot 330. Alternately, the reflectors can be pivotally secured by conventional hinges or rivets. Mounting panel 350 is normally retained in the position shown in FIG. 17 in use and may be accessed for service by pivoting the lens panel 360 to a generally vertical position. This allows convenient access to the mounting panel 350 which similarly may be moved to a horizontal position to provide access to the electrical components or to facilitate replacement of lamps on the underside of the panel 350.

The lens panel 360 has an exterior lens frame 361 which has a flange 362 which extends around the lower edge of the housing side walls in the closed position as seen in FIG. 17. A transparent or translucent lens 363 is supported by the frame and passages and diffuses light from the lamps.

The mounting panel 350 is retained in the horizontal position by a pair of detents 375 shown in detail in FIG. 16. The detents 375 are positioned on the housing side walls at opposite sides of the panel 350 adjacent the end opposite the pivot pins. The detent consists of a deflectable detent arm 376, one end of which is fixedly secured to the associated side wall such as side wall 304 by a rivet or other fastener 377. The opposite end of the arm carries a projection or button 378 which extends through an aperture 379 in the wall 304 projecting inwardly a small distance. The edges 356 of the reflector panel are supported by the detent buttons when the panels are in the horizontal, closed position. When the lens panel 360 is opened, as seen in FIG. 15, the reflector panel 310 may be released or dropped to a generally vertical position by manually applying force to the detent buttons pushing them in an outward direction so that they become disengaged from the edges of the reflector panel allowing the reflector panel to drop downwardly.

As seen in FIG. 17, a retainer 330 having a spring arm 332, is secured to the interior of end wall 301 of the housing and may be provided to further secure the reflector in the horizontal position. The spring arm has an end 334 which engages or applies a biasing force to the upper surface of the reflector 350.

The lens panel 360 is also securable in a horizontal position by means of detents 340 which are mounted on the side walls 308, near the lower edges of the side walls. The detents 340 are engageable in apertures 341 in the opposite sides of the lens panel frame. The lens panel 360 is pivotally attached to the housing side wall 306 at a pair of slots 308. The lens frame 362 has U-shaped hangers 361 which are engageable in the slots 308 as best seen in FIG. 18. This allows the lens panel to be suspended in a horizontal position as shown in FIG. 15 to provide access to the interior of the housing. In the normal use position, the lens panel is pivoted to a horizontal position and locked into this position by the detents 340 at the side wall 308. The detents 340 are the same as 375 and may be released by applying manual pressure to the detent buttons which will disengage the buttons from the apertures 380 and the lens frame 362 allowing the panel to swing to the horizontal drop position.

The modular structure allows the manufacturer or installer to assemble or refit the fixture in accordance with the requirements of the user in the installation. The modular structure also minimizes or eliminates the need for special fasteners or tooling as the panel is provided with bend-down tabs which can be erected as necessary to secure the lamp and reflector in position. Any desired number of lamps can be selected for use with a fixture. The fixture may also be provided in various shapes and may also be provided as a retrofit for many existing installations in which a housing already exists. In this case, the panel would be configured to be geometrically consistent with the shape of the existing housing. The existing housing would only have to be modified to provide the hanger brackets in the desired location. Once this is done, the panel can be suspended from the hanger brackets for pivotal movement as from the closed, normal operating position to the open maintenance access position as described above.

Thus, it will be seen that the present invention provides improved construction for a lighting fixture which facilitates both initial installation and subsequent maintenance. It will be obvious to those skilled in the art to make various changes, alterations and modifications to the invention as described herein. To the extent these various alterations, changes and modifications do not depart from the spirit and scope of the appended claims, they are intended to be encompassed therein.

I claim:

1. A light fixture for lamps comprising:
   (a) a housing having a side wall forming an enclosure, said housing having an open bottom;
   (b) first hinge members provided on the interior of said housing;
   (c) a mounting panel having opposite sides and ends, said mounting panel having an upper and lower surface, socket means associated with said mounting panel for mounting at least one lamp on the lower surface thereof and further including second hinge members cooperative with said first hinge members;
   (d) first detent means on said housing side wall and selectively engageable with said mounting panel whereby said mounting panel may be pivoted from a maintenance and installation position in which said mounting panel is generally suspended in a vertical position from said housing to a use-position in which said mounting panel is maintained by said first detent means in a generally horizontal position across said open bottom and
   (e) a lens panel hinged to said housing below said mounting panel and second detent means on said side wall selectively engageable with said lens panel whereby said lens panel may be pivoted from a maintenance and installation position in which said lens panel is generally suspended in a vertical position from said housing to a use-position in which said lens panel is maintained by said first detent means in a generally horizontal position across said open bottom of said housing.

2. The light fixture of claim 1 wherein said housing has a top panel, said top panel defining a knock-out section for electrical connection.

3. The light fixture of claim 1 wherein at least one ballast is secured to the housing.

4. The light fixture of claim 1 wherein said housing is formed of sheet metal.

5. The light fixture of claim 1 further including a reflector on said mounting panel extending generally coaxial with respect to said lamp on said lower mounting panel surface.

6. The light fixture of claim 1 wherein said socket means are located at opposite ends of said mounting panel and wherein said socket means are for compact fluorescent lamps there being a plurality of said socket means arranged in oppositely disposed relationship.

7. The light fixture of claim 1 wherein said detent means comprises a deflectable spring arm affixed to said housing and a projection on said arm normally engaging said mounting panel in a use-position.

8. A method of mounting a fluorescent fixture in a housing comprising:
   (a) providing a housing with a first hinge means;
   (b) providing a mounting panel having second hinge means associated therewith, said mounting panel having opposite top and bottom surfaces;
   (c) securing ballast means to said housing;
   (d) securing lamp sockets to the mounting panel in selected positions to mountably position at least one lamp extending along the bottom surface of said mounting panel;
   (e) suspending said mounting panel from said housing in a generally vertical position with said first and second hinge means in engagement;
   (f) completing electrical connections between the ballast and a source of power;
   (g) installing reflectors disposed between said lamps and said mounting panel wherein said reflectors are retained in place by extending at least one bendable tab integrally formed in said panel into retaining engagement with said reflectors; and
   (h) pivoting the panel to a generally horizontal position within said housing and latching the panel in an operative position at detent means.

9. The method of claim 8 wherein said lamps comprise a plurality of lamps arranged in oppositely-extending, parallel relationship.

10. A method of mounting a fluorescent fixture in a housing comprising:
   (a) providing the housing with a first hinge means;
   (b) providing a mounting panel having second hinge means associated therewith, said mounting panel having opposite top and bottom surfaces;
   (c) securing ballast means to said housing;
   (d) securing lamp sockets to the mounting panel in selected positions to mountably position at least one lamp along the bottom surface of said mounting panel;
   (e) suspending said mounting panel from said housing in a generally vertical position with said first and second hinge means in engagement;
   (f) completing electrical connections between the ballast and a source of power;
   (g) pivoting the mounting panel to a generally horizontal position within said housing and latching the mounting panel in an operative position at first detent means; and
   (h) providing a lens panel below said mounting panel, said lens panel being pivotally secured to said housing and being securable in a generally horizontal position with respect to said housing by second detent means.

* * * * *